United States Patent [19]

Bearden, Jr. et al.

[11] Patent Number: 4,740,295
[45] Date of Patent: Apr. 26, 1988

[54] HYDROCONVERSION PROCESS USING A SULFIDED MOLYBDENUM CATALYST CONCENTRATE

[75] Inventors: Roby Bearden, Jr.; Clyde L. Aldridge; Francis X. Mayer; James H. Taylor; William E. Lewis, all of Baton Rouge, La.

[73] Assignee: Exxon Research and Engineering Company, Florham Park, N.J.

[21] Appl. No.: 944,444

[22] Filed: Dec. 22, 1986

Related U.S. Application Data

[63] Continuation-in-part of Ser. No. 854,307, Apr. 21, 1986, abandoned.

[51] Int. Cl.$^4$ .................. C10G 47/02; C10G 1/08
[52] U.S. Cl. .................... 208/421; 208/108; 208/112; 208/216 R; 208/251 H; 208/254 H
[58] Field of Search .............. 208/420, 421, 112, 108, 208/216 R, 251 H, 254 H; 502/162, 168, 211, 150

[56] References Cited

U.S. PATENT DOCUMENTS

| | | | |
|---|---|---|---|
| 4,077,867 | 3/1978 | Aldridge et al. | 208/10 |
| 4,111,787 | 3/1978 | Aldridge et al. | 208/10 |
| 4,134,825 | 1/1979 | Bearden, Jr. et al. | 208/213 |
| 4,226,742 | 10/1980 | Bearden, Jr. et al. | 252/431 |
| 4,244,839 | 1/1981 | Aldridge et al. | 252/431 |
| 4,424,110 | 1/1984 | Bearden, Jr. et al. | 208/420 |
| 4,637,870 | 1/1987 | Bearden, Jr. et al. | 208/112 |
| 4,637,871 | 1/1987 | Bearden, Jr. et al. | 208/112 |

FOREIGN PATENT DOCUMENTS 2735609 4/1978 Fed. Rep. of Germany ...... 208/420

*Primary Examiner*—Paul E. Konopka
*Attorney, Agent, or Firm*—Henry E. Naylor

[57] ABSTRACT

Hydroconversion processes utilizing a catalyst prepared from a catalyst precursor concentrate such as phosphomolybdic acid, is provided. The catalyst precursor concentrate is treated at relatively low pressures in a specified manner.

7 Claims, 3 Drawing Sheets

OPTICAL MICROGRAPH

PRESULFIDED – PREFORMED CATALYST OF
THIS INVENTION (EXAMPLE 2)

200X MAGNIFICATION
1MM = 5 MICRONS

OPTICAL MICROGRAPH

PREFORMED CATALYST OF PRIOR ART
SEE EXAMPLE 7

200X MAGNIFICATION
1MM = 5 MICRONS

HYDROCONVERSION PROCESS USING A SULFIDED MOLYBDENUM CATALYST CONCENTRATE

CROSS REFERENCE TO RELATED APPLICATIONS

This application is a continuation-in-part application of copending Ser. No. 854,307, filed Apr. 21, 1986 now abandoned.

BACKGROUND OF THE INVENTION

1. Field of the Invention

This invention relates to an improvement in a slurry hydroconversion process utilizing a metal-containing catalyst prepared from a catalyst precursor dispersed in a hydrocarbon.

2. Description of Information Disclosures

Slurry hydroconversion processes utilizing a catalyst prepared in a hydrocarbon oil from thermally decomposable or oil soluble metal compound precursors are known. See, for example, U.S. Pat. Nos. 4,226,742; 4,244,839 and 4,111,787.

It is also known to use such catalysts in hydroconversion processes (i.e., coal liquefaction) in which coal particles are slurried in a hydrocarbonaceous material. See, for example, U.S. Pat. No. 4,077,867.

The term "hydroconversion" with reference to a hydrocarbonaceous oil is used herein to designate a catalytic process conducted in the presence of hydrogen in which at least a portion of the heavy constituents of the oil is converted to lower boiling hydrocarbon products while it may simultaneously reduce the concentration of nitrogenous compounds, sulfur compounds and metallic constituents of the oil.

The term "hydroconversion" with reference to coal is used herein to designate a catalytic conversion of coal to normally liquid hydrocarbons in the presence of hydrogen.

All boiling points referred to herein are atmospheric pressure equivalent boiling points unless otherwise specified.

It has now been found that a catalyst can be prepared from a molybdenum containing catalyst precursor concentrate at relatively low pressures in a specified manner and that use of the catalyst in a hydroconversion process will provide advantages that will become apparent in the ensuing description.

SUMMARY OF THE INVENTION

In accordance with the present invention, there is provided a process for hydroconverting a carbonaceous chargestock comprising a hydrocarbon to produce a hydroconverted oil product, which comprises reacting the carbonaceous chargestock comprising a catalyst with hydrogen at hydroconversion conditions, said catalyst having been prepared by the steps which comprise: (a) forming a mixture of a hydrocarbonaceous oil comprising constituents boiling above about 1050° F. and said aqueous solution of precursor in an amount to provide from about 0.2 to 2 weight percent molybdenum, calculated as elemental molybdenum, based on said hydrocarbonaceous oil to produce a water-containing catalyst precursor concentrate; (b) drying said water-containing catalyst precursor concentrate to remove said water and produce a substantially water-free catalyst precursor concentrate; (c) contacting said water-free catalyst precursor concentrate with added hydrogen sulfide at a temperature of at least about 50° F. and a hydrogen sulfide partial pressure ranging from about 14.7 psia to about 100 psia to produce a sulfided catalyst precursor concentrate; (d) heating said sulfided catalyst precursor concentrate in the absence of hydrogen sulfide and in the absence of hydrogen, at a temperature of at least about 600° F. and a total pressure ranging from about 0 to about 100 psig, for a time sufficient to convert said sulfided catalyst precursor to a solid molybdenum-containing catalyst and, thereby, produce a catalyst concentrate.

Alternatively, the molybdenum containing precursor used to prepare the catalyst concentrate can comprise an oil soluble compound such as molybdenum naphthenate or molybdenyl bisacetylacetonate.

The term "phosphomolybdic acid" is used herein to designate aqueous solutions of the reaction product of $MoO_3$ with dilute phosphoric acid in which the phosphorus to molybdenum atomic ratio ranges from 0.083 to 2.00, preferably from 0.083 to 1.00 and most preferably from 0.083 to 0.50. Said solutions can contain one or more phosphomolybdic acid species such as the 12-molydophosphoric acid and the dimeric 18-molybdophosphoric acid. Moreover, the crystalline 12 and 18 acids can be used to prepare the water solutions of phosphomolybdic acid used in the process of the invention. As to phosphomolybdic acids refer to *Topics In Current Chemistry* No. 76, published by Springer-Verlag of New York, pp. 1-64, 1978.

DESCRIPTION OF THE PREFERRED EMBODIMENT

Figure 1:
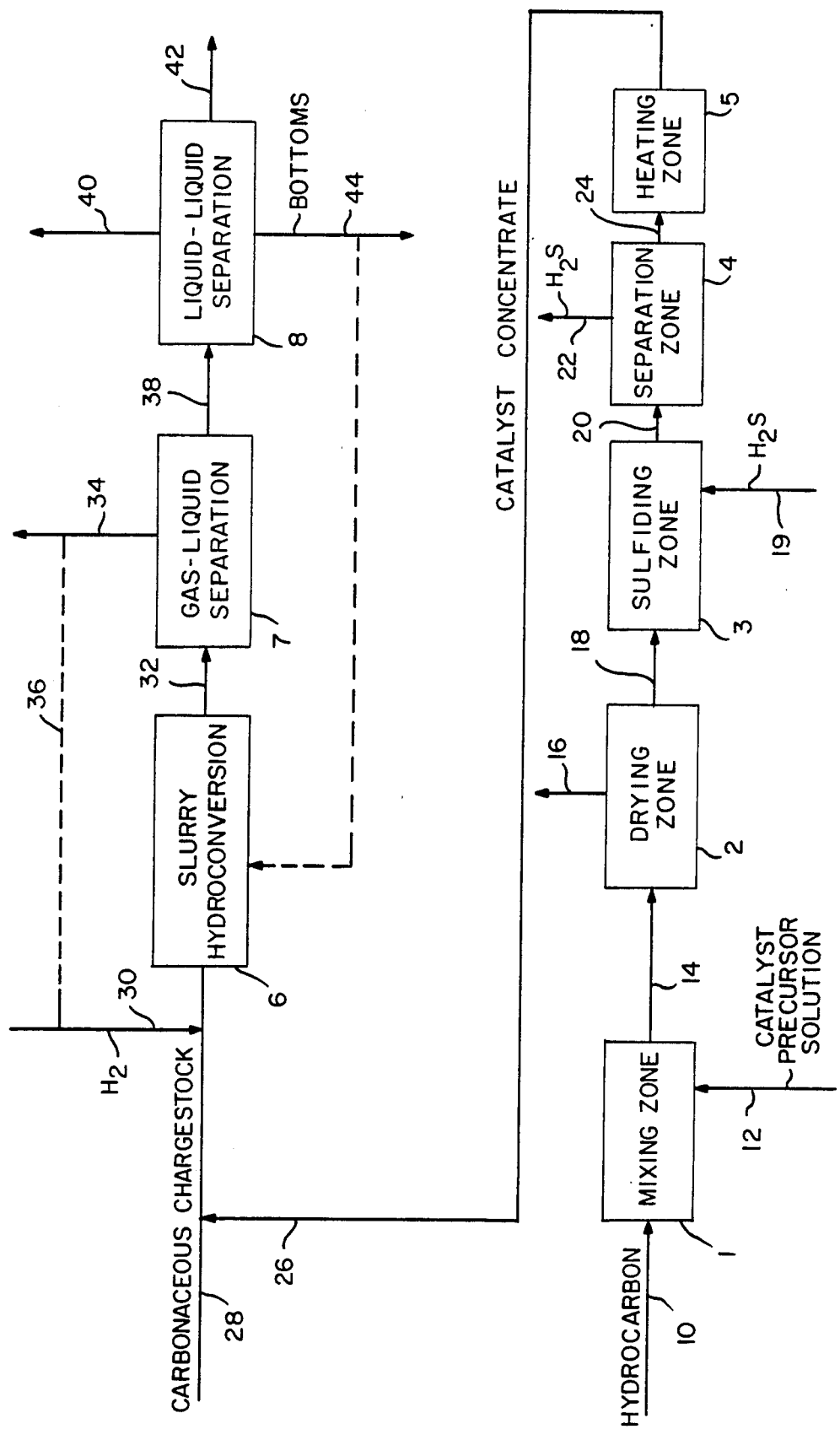
FIG. 1 is a schematic flow plan of one embodiment of the invention.

Referring to the figure, a heavy hydrocarbonaceous oil is introduced by line 10 into mixing zone 1. Suitable heavy hydrocarbonaceous oils for introduction into mixing zone 1 include hydrocarbonaceous oils comprising constituents boiling above 1050° F., preferably having at least 10 wt. % constituents boiling above 1050° F., such as crude oils, atmospheric residua boiling above 650° F., vacuum residua boiling above 1050° F. The hydrocarbonaceous oils may comprise sulfur components such as, for example, at least about 1 weight percent, preferably at least about 4 weight percent, sulfur calculated as elemental sulfur and at least about 0.1 weight percent, preferably at least about 0.3 weight percent nitrogen calculated as elemental nitrogen (N). The sulfur and nitrogen are typically present as organic compounds. If desired, a source of sulfur, such as an organic sulfur compound or elemental sulfur may be added to the oil. Preferably, the hydrocarbonaceous oil has an initial boiling point above at least 650° F. and comprises asphaltenes and/or resins. The hydrocarbonaceous oil carried by line 10 may be derived from any source such as petroleum, tar sand oil, shale oil, liquids derived from coal liquefaction processes and mixtures thereof. Generally, these oils have a Conradson carbon content ranging from about 5 to about 50 wt. % (as to Conradson carbon, see ASTM test D-189-65). An aqueous solution of phosphomolybdic acid (catalyst precursor) is introduced into mixing zone 1 by line 12. A sufficient amount of the aqueous phosphomolybdic acid solution is introduced into mixing zone 1 to provide from about 0.2 to 2, preferably from about 0.2 to 1, more preferably 0.3 to 1 wt. % molybdenum from the phosphomolybdic acid, calculated as elemental molybdenum based on the hydrocarbonaceous oil. The resulting mixture is a water-containing catalyst precursor concentrate (i.e., wet catalyst precursor concentrate). The wet catalyst precursor concentrate is removed from mixing zone 1 by line 14 and passed to drying zone 2 in which water is removed from the wet catalyst precursor concentrate by any suitable manner, such as, for example, by heating the water-containing catalyst precursor concentrate to a temperature sufficient to vaporize the water, for example, a temperature ranging from 212° to 300° F. The $H_2O$ is removed from drying zone 2 by line 16. The essentially water-free (i.e., dry) catalyst precursor concentrate is removed from drying zone 2 and is passed to sulfiding zone 3. This sulfiding step may be omitted from the sequence to produce less preferred catalysts. In sulfiding zone 3, the dry catalyst precursor concentrate is contacted with a sulfiding agent which may be a hydrogen sulfide-containing gas or a hydrogen sulfide precursor. Hydrogen may be present or absent during the sulfiding step. Preferably the sulfiding agent is a gas comprising from 10 to 100 mole percent hydrogen sulfide. The sulfiding step is conducted at relatively low total pressures. Suitable low pressures include a total pressure ranging from about 0 to 450 psig, preferably a pressure ranging from about 0 to 100 psig. The hydrogen sulfide partial pressure may range from about 14.7 psia to 200 psia, preferably from 20 psia to 100 psia. Suitable temperatures in the sulfiding zone include a temperature of at least about 50° F., preferably from about 50° to 600° F., more preferably from about 200° to 400° F. Contact of the dry catalyst precursor concentrate with the sulfiding agent at the given conditions produces a sulfided catalyst precursor concentrate. The effluent of the sulfiding zone comprising the sulfided catalyst precursor concentrate and a gaseous phase including the unreacted $H_2S$ is passed by line 20 to separation zone 4 in which the gaseous phase comprising the $H_2S$ is separated from the sulfided catalyst precursor concentrate. The gaseous phase is removed by line 22. The sulfided catalyst precursor concentrate is passed by line 24 into heating zone 5. In heating zone 5, the sulfided catalyst precursor concentrate of the preferred embodiment (or the non-sulfided catalyst precursor concentrate from zone 2) is heated at a temperature of at least about 600° F., preferably at a temperature ranging from 650° to 800° F. and a total pressure ranging from 0 psig to 100 psig, preferably from 0 psig to 50 psig, in the absence of added hydrogen sulfide and in the absence of added hydrogen, for a time sufficient to convert the catalyst precursor to a solid molybdenum-containing catalyst and, thereby, produce a catalyst concentrate. Zone 5 may be considered a catalyst formation zone in which the sulfided catalyst precursor or the phosphomolybdic acid catalyst precursor is converted to the solid-molybdenum-containing catalyst. The catalyst concentrate is removed from heating zone 5 by line 26. At least a portion of the catalyst concentrate is introduced into line 28 which carries a carbonaceous chargestock comprising a hydrocarbon which may have the same boiling point range as the hydrocarbonaceous oil of line 10 or the hydrocarbon may be a single hydrocarbon (e.g., tetralin) or a mixture of hydrocarbons having the same boiling point range as the hydrocarbonaceous oil of line 10 or a different boiling point range from the hydrocarbonaceous oil of line 10. The carbonaceous chargestock may be a hydrocarbonaceous oil or coal in a hydrocarbon diluent. Suitable hydrocarbonaceous oil chargestocks include crude oils; mixtures of hydrocarbons boiling above 430° F., preferably above 650° F., for example, gas oils, vacuum residua, atmospheric residua, once-through coker bottoms, and asphalt. The hydrocarbonaceous oil chargestock may be derived from any source, such as petroleum, shale oil, tar sand oil, oils derived from coal liquefaction processes, including coal liquefaction bottoms, and mixtures thereof. Preferably, the hydrocarbonaceous oils have at least 10 wt. % materials boiling above 1050° F. More preferably, the hydrocarbonaceous oils have a Conradson carbon content ranging from about 5 to about 50 wt. %. Coal may be added to any of these oils. Alternatively, slurries of coal in a hydrocarbon diluent may be used as chargestock to convert the coal (i.e., coal liquefaction). The diluent may be a single type of hydrocarbon or a mixture of hydrocarbons and may be a light hydrocarbon or a heavy hydrocarbon, as described in U.S. Pat. No. 4,094,765, column 1, lines 54 to column 2, line 43, the teachings of which are hereby incorporated by reference. When the chargestock into which at least a portion of the catalyst concentrate of line 26 is introduced is an oil, the concentrate disperses in the oil. If the chargestock comprises coal in a diluent, the portion of concentrate of line 26 is added to the diluent before, after or simultaneously with the addition of coal to the diluent. A hydrogen-containing gas is introduced by line 30 into line 28. The mixture of carbonaceous chargestock, catalyst concentrate and hydrogen is passed into slurry hydroconversion zone 6. The catalyst concentrate of line 26 is added to the carbonaceous chargestock in an amount sufficient to provide from about 10 to about 2000 wppm molybdenum, preferably 50 to 1000 wppm molybdenum, calculated as the elemental molybdenum, based on the total hydroconversion zone chargestock, i.e., concentrate plus carbonaceous chargestock.

Suitable hydroconversion operating conditions are summarized in Table I.

TABLE I

| Conditions | Broad Range | Preferred Range |
|---|---|---|
| Temp., °F. | 800 to 900 | 820 to 870 |
| $H_2$ Partial Pressure, psig | 50 to 5000 | 100 to 2500 |

The hydroconversion zone effluent is removed by line 32 and passed to a gas-liquid separation zone 7 wherein the normally gaseous phase is separated from a normally liquid phase. The gaseous phase is removed from separation zone 7 by line 34. Alternatively, the gaseous phase, which comprises hydrogen, may be recycled by line 36, preferably after removal of undesired constituents to slurry hydroconversion zone 6 via line 30. The normally liquid phase, which comprises the molybdenum-containing catalytic solids and a hydroconverted hydrocarbonaceous oil product is passed by line 38 to separation zone 8 for fractionation by conventional means, such as distillation into various fractions such as light, medium boiling and heavy bottoms fractions. The light fraction is removed by line 40. The medium boiling fraction is removed by line 42. The heavy bottoms fraction is removed by line 44, and, if desired, at least a portion of the bottoms fraction may be recycled to hydroconversion zone 6.

Furthermore, if desired, the catalytic solids may be separated from the hydroconverted oil product and the separated solids may be recycled to hydroconversion zone 6.

The following examples are presented to illustrate the invention.

EXAMPLE 1

Preparation of Presulfided Preformed Catalyst Concentrate (PHC Preparation 112)

The catalyst precursor concentrate preparation was carried out in a stainless steel tank that had a mixing zone with an internal diameter of 10 inches and a height of 12 inches. A six-inch diameter, pitched-blade impeller with four 45° blades was used for stirring and was operated at a speed of 500 revolutions per minute. Heat was supplied by high pressure steam coils and by electrical strip heaters located on the external surface of the tank. Also, the tank was equipped for addition and maintenance of a gaseous atmosphere during concentrate preparations.

Step A

Formation of Wet Catalyst Precursor Concentrate

The tank was charged with 12,600 g of Cold Lake crude that contained 50 wt. % components boiling above 975° F., a sulfur content of 4.15 wt. %, a nitrogen content of 0.44 wt. %, a Conradson carbon content of 12.9 wt. % and an initial boiling point of 471° F. After flushing with nitrogen, the tank was heated with stirring to 176° F. whereupon 672.4 grams of a phosphoric acid modified aqueous solution of phosphomolybdic acid was added over the course of about 15 seconds. The water solution was prepared at room temperature by dissolving 117.1 g of crystalline phosphomolybdic acid (45.3% Mo) in 544.1 g deionized water and then adding 11.18 g phosphoric acid (85 wt. % $H_3PO_4$) to obtain a solution that contained 7.9 wt. % Mo and a P/Mo atom ratio of 0.25/1. Stirring was continued at 176° F. for 30 minutes whereupon the wet catalyst precursor concentrate was transferred to a vessel for removal of water.

Step B

Preparation of Dry Catalyst Precursor Concentrate

The wet catalyst precursor concentrate of Step A was charged to an open-top drum that was equipped with internal and externally mounted high pressure steam coils. Temperature was increased to 275° F. over the course of approximately 45 minutes to remove bulk water.

Step C

Preparation of Presulfided Catalyst Precursor Concentrate

The mixing tank of Step A was charged with 10,000 g of the dry catalyst precursor concentrate from Step B, and after flushing with nitrogen, was heated with stirring to a temperature of 325° F., whereupon 50 psig hydrogen sulfide was added and stirring was continued at 325° F. under 50 psig $H_2S$ pressure for 40 minutes to complete the sulfiding reaction.

Step D

Removal of Hydrogen Sulfide

While still at 325° F. the mixing tank was vented and then purged with nitrogen to remove hydrogen sulfide.

A sample of this $H_2S$ free, sulfided catalyst precursor concentrate (i.e., sulfided catalyst precursor in Cold Lake crude) was found to contain 0.417 wt. % Mo and 4.600 wt. % sulfur.

Step E

Formation of Catalyst Concentrate

Upon removal of $H_2S$ in Step D, the mix tank was heated with stirring to 725° F. and was held at this temperature with stirring for a period of 20 minutes under a regulated, autogenous pressure of 25 psig. In the course of this treatment, a portion of the lower boiling components of the Cold Lake crude was removed by distillation. The resultant catalyst concentrate, which was determined to contain 0.503 wt. % Mo by assay, was cooled and stored under nitrogen for future use.

A sample of 30 g of the catalyst concentrate was diluted with 90 g of toluene at room temperature and then filtered over a No. 2 Whatman paper to recover catalyst solids, which solids were subsequently dried under vacuum for one hour at 100° C. In this manner there was recovered 0.99 g (3.3 wt. % on concentrate) of finely divided catalyst solids that contained 12.5 wt. % Mo.

EXAMPLE 2

Preparation of Presulfided-Preformed Catalyst Concentrate For Particle Size Determination (PHC-131)

The preparation described in Example 1 was repeated to obtain a fresh sample of catalyst concentrate for analysis to determine particle size.

Figure 2:
FIG. 2 is a photomicrograph of the presulfided preformed catalyst of the present invention prepared in accordance with the procedure of Example 2 hereof.

Particle size was determined by placing a smear of the concentrate on an optical microscope slide and viewing at 200× magnification. FIG. 2 is a photograph of the microscope field (1 millimeter=5 microns). As shown, this catalyst concentrate is comprised of a highly dispersed phase of uniform, small (1-2 micron) catalyst particles.

EXAMPLE 3

Preparation of Presulfided-Preformed Catalyst Solids for Surface Area Measurement (PHC-133)

The preparation described in Example 1 was repeated. A sample of 50 g of the resultant catalyst concentrate (designated PHC-133) was diluted with 150 g toluene at room temperature and then filtered over a No. 2 Whatman paper to recover catalyst solids, which solids were subsequently dried under vacuum for one hour at 100° C. In this manner there was recovered 1.53 g (3.1 wt. % on concentrate) of finely divided catalyst solids that contained 12.4 wt. % Mo and that exhibited a surface area of 0.30 $m^2/g$.

EXAMPLE 4

Preparation of Presulfided-Preformed Catalyst of Example 1 in Laboratory Autoclave (R-2056-cp)

The presulfided-preformed catalyst of Example 1 was prepared in a 300 cc Autoclave Engineer's autoclave using the procedure of Example 1.

Step A

A solution of 0.8 g phosphomolybdic acid in 9.2 g of deionized water was injected into 90 g of whole Cold Lake crude while stirring at 176° F., and stirring (1800 RPM) was continued for 10 minutes.

Step B

The autoclave was then heated with stirring to 300° F. and held for 10 minutes with nitrogen flow-through to remove water.

Step C

At this point the autoclave was charged with 50 psig $H_2S$ and stirring at 300° F. was continued for an additional 30 minutes.

Step D

Hydrogen sulfide was removed from the autoclave by venting pressure at 300° F. and then flushing with nitrogen.

Step E

With the autoclave free of $H_2S$ and blocked-in, the temperature was increased to 725° F. for a 30 minute stirred contact to complete catalyst formation, whereupon the autoclave was vented and cooled to room temperature.

There was recovered 74.0 g of presulfided preformed catalyst concentrate that contained 0.541 wt. % Mo.

EXAMPLE 5

Experiments Illustrating That Step B of Example 4 is Critical to This Invention

Experiments were carried out to show that the presulfiding step (Step C) of Example 4 is inhibited if one does not first dry the precursor concentrate (Step B).

In the first experiment, designated R-1838-CP, a solution of 0.8 g phosphomolybdic acid in 9.2 g of deionized water was injected into 90 g of whole Cold Lake crude while stirring at 176° F. in a standard 300 cc Magnedrive autoclave from Autoclave Engineers. Stirring (1800 rpm) was continued for 10 minutes at 176° F. to complete formation of the wet catalyst precursor concentrate (Step A of Example 4). The autoclave was then heated with stirring to 300° F. and held for 10 minutes with a flow of nitrogen to remove water (corresponds to Step B of Example 4), whereupon the autoclave was blocked in (made pressure tight) and heated for an additional 30 minutes at 300° F. with stirring to simulate temperature/time conditions used in presulfiding. Upon venting, flushing with nitrogen, and cooling the autoclave, there was recovered a nonsulfided concentrate that assayed for 4.23 wt. % sulfur, which amount corresponds to the sulfur content of the Cold Lake crude used in this preparation.

In a second experiment (R-1839-CP), which is in accord with this invention, the steps of the first experiment were repeated except that the last 30 minutes of stirring at 300° F. was carried out in the presence of 50 psia $H_2S$. After venting the autoclave at 150° C., flushing with $N_2$ to remove all traces of $H_2S$ and then cooling there was recovered a presulfided concentrate that contained 4.59 wt. % sulfur or an increase of 0.36 wt. % sulfur over the base preparation (R-1838-CP). The theoretical sulfur increase for converting Mo contained in this preparation to $MoS_2$ is 0.30 wt. %, thus, based on sulfur increase, complete sulfiding was achieved.

In a third experiment (R-1830-CP) all of the steps of the second experiment were repeated except that the drying step was carried out in a fashion such that 0.6 g of water (about 6.4% of water present initially) remained in the concentrate. The autoclave was then charged with 50 psia $H_2S$, blocked off, and heated at 300° F. for the 30 minute presulfiding step. The presulfided precursor from this procedure assayed for 4.36 wt. % sulfur (an increase of 0.13 wt. % sulfur over base) which corresponds to 43.3% conversion of Mo to $MoS_2$.

TABLE II

| Results of Presulfiding Experiments | | | |
|---|---|---|---|
| Experiment No. | R-1838-cp | R-1839-cp | R-1830-cp |
| Conditions for a 30 min. 300° F. Presulfiding Step | | | |
| Wt. % $H_2O$ in Concentrate | 0 | 0 | 0.65 |
| psia $H_2S$ | 0 | 50 | 50 |
| Sulfur in Presulfided Conc., g. | 4.23* | 4.59 | 4.36 |
| Amount of sulfur increase, g. | (base) | 0.36** | 0.13** |
| % Sulfiding (Mo → $MoS_2$) | 0 (Base) | 100.0 | 43.3 |

*Valve corresponds to sulfur (mostly organically bound) contained in Cold Lake crude
**Theoretical increase in sulfur is 0.30 g if contained Mo (0.443 g) is converted to $MoS_2$

EXAMPLE 6

Preparation of Presulfided-Preformed Catalyst of Example 4 With Step D Omitted (R-2082-cp)

The preparation described in Example 4 was repeated except that Step D, removal of $H_2S$, was omitted from the procedure thus resulting in Step E being carried out in the presence of $H_2S$. There was recovered 68.0 g of catalyst concentrate that contained 0.588 wt. % Mo.

EXAMPLE 7

Preparation of Prior Art Catalyst Described in U.S. Pat. No. 4,244,839

A preformed catalyst concentrate (R-2074-cp) was prepared according to Example 17 of U.S. Pat. No. 4,244,839.

The preparation was carried out as follows. To a 300 ml stirred autoclave, there was charged 91.64 g. of Light Arabian vacuum gas oil (0.46% Conradson carbon) and a solution comprised of 0.565 g of phosphomolybdic acid in 1.695 g. of anhydrous isopropyl alcohol. The autoclave was flushed with hydrogen and then pressured with 105 psia of $H_2S$ and 2000 psia of hydrogen at room temperature. The autoclave was heated at 725° F. for 30 minutes followed by a 30 minute period at 840° F. Upon cooling to room temperature, the autoclave was depressured and the liquid contents were discharged.

Figure 3:
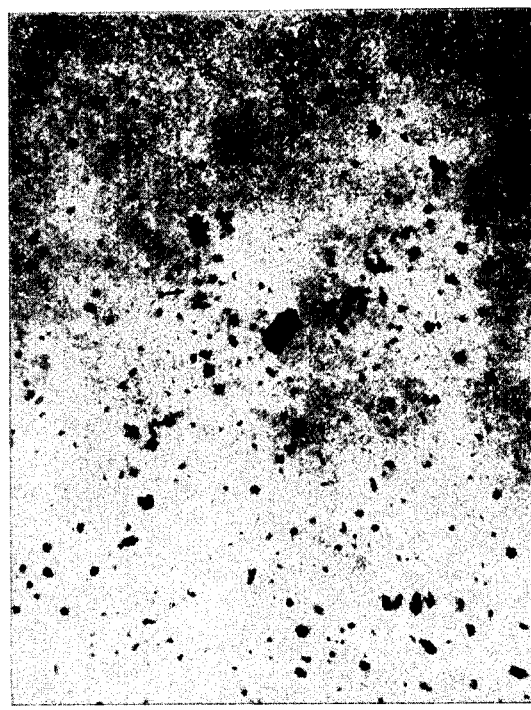
FIG. 3 is a photomicrograph of a preformed catalyst of the prior art prepared in Example 7 hereof.

An optical micrograph was made at 200× magnification of the dispersion of catalyst particles in the autoclave product (FIG. 3). Based on the scale of 1 millimeter=5 microns it is seen that the size of catalyst particles in this preparation fall in the range of 1.0 to 40.0 microns and that most of the particles are 5 microns and above.

A second repetition of Example 17 of U.S. Pat. No. 4,244,839 was made and the resultant catalyst concentrate preparation (R-2088-cp), which contained 0.325 wt. % Mo, was held for a catalyst effectiveness tests in residuum hydroconversion.

EXAMPLE 8

Test of Presulfided Preformed Catalyst Concentrate For Hydrogenation Activity (Run 1281)

To a 300 cc Autoclave Engineers Magnetically stirred autoclave was charged 119.12 g of Cold Lake crude oil plus 0.88 g of low pressure presulfided preformed catalyst concentrate of Example 1 to provide 35 ppm of molybdenum in the charge. The autoclave was flushed with H₂, pressure tested and vented to atmospheric pressure, then pressured to 50 psia with H$_2$S and then to 1650 psig with H$_2$. This gas charge was then vented through caustic scrubbers and the H$_2$ measured through a wet test meter. This measurement gives the initial H$_2$ charge. The autoclave was then repressured with H$_2$S and H$_2$ in the same manner and the experiment started. The autoclave was heated with stirring over a period of 43 minutes to 716° F. and held at 716°–725° F. for 20 minutes after which it was further heated to 820.4° F. over a period of 19 minutes and held at 820.4°–829.4° F. for 15 minutes at which time the autoclave was rapidly cooled by means of an internal water coil. The gases were vented through caustic scrubbers, measured with a wet test meter, collected and analyzed by mass spectrometry. Comparison of the amount of recovered hydrogen with that charged showed that 8.714 liters STP (standard temperature and pressure) of hydrogen was consumed. See Table III for summary comparing this catalyst with those of prior art disclosures.

EXAMPLE 9

Test of Prior Art Catalyst Disclosed in U.S. Pat. No. 4,244,839 for Hydrogenation Activity A comparative experiment was carried out similar to that of Example 8 except that molybedenum was supplied from the catalyst concentrate of Example 7, a concentrate that was prepared according to Example 17 of U.S. Pat. No. 4,244,839.

The autoclave charge consisted of 118.71 g of whole Cold Lake crude and 1.29 g of Example 7 catalyst concentrate (R-2088-cp), an amount that furnished 35 wppm Mo in the autoclave charge.

Comparison of the amount of recovered hydrogen with that charged showed that 6.49 liters (STP) of hydrogen was consumed. See Table III for summary that compares this catalyst performance with that of the catalyst of this invention.

EXAMPLE 10

Test of Catalyst System of Prior Art (U.S. Pat. No. 4,134,825) for Hydrogenation Activity An experiment was carried out similar to that of Example 8 except that molybdenum was supplied as molybdenum naphthenate (6% Mo content, supplied by Shepherd Chemical Co.) and that the naphthenate was added directly to the Cold lake crude feedstock in accordance with the method described in U.S. Pat. No. 4,134,825. With this catalyst system, 55 wppm Mo on feed was required to provide sufficient catalyst activity to cause consumption of 8.71 liters (STP) of H$_2$.

As can be seen from the comparisons given in Table III the hydrogenation activities of the prior art catalyst system of this example (Mo naphthenate) and of the prior art catalyst of Example 7 (U.S. Pat. No. 4,244,839) are less than that of the presulfided-preformed catalyst preparation (Example 1) of this invention.

TABLE III

Summary of Hydrogenation Activity Tests

| Mo Source | Example No. 8 Presulfided Preformed Cat. of Example 1 | Example No. 9 Prior Art Catalyst of Example 7 | Example No. 10 Prior Art Catalyst of U.S. Pat. No. 4,134,825 |
|---|---|---|---|
| Wppm Mo | 35 | 35 | 55 |
| H₂ Consumed, liters (STP) | 8.71 | 6.49 | 8.71 |
| Relative Activity, % | 157 | * | 100 |

*Catalyst is much less active than catalyst of this invention (Example 8). Estimate activity at no more than 75% (6.49/8.71 × 100) of that of Example 8 catalyst

EXAMPLE 11

Test of Presulfided Preformed Catalyst Concentrate of Example 4 Under Hydroconversion Conditions (R-2058-FT)

A hydroconversion experiment was carried out with a topped Cold Lake crude feedstock that had an initial boiling of 975+° F. and that contained 23.37 wt. % of Conradson carbon components.

To a 300 cc stirred, Autoclave Engineers autoclave there was charged 109.50 g of 975+° F. Cold Lake feed, 6.07 g of whole Cold Lake crude and 4.43 g of the catalyst preparation (R-2056-cp) of Example 4. This amount of catalyst provided a Mo concentration of 200 wppm on the total reactor charge, i.e., the combined weight of 975+° F. Cold Lake, Cold Lake crude and catalyst preparation. The autoclave was then flushed with hydrogen, sealed and stirred for 10 minutes at 200° F. to premix the charge.

Upon cooling to room temperature the autoclave was charged with 1,350 psig H$_2$ and heated with stirring to 725° F. where it was held, with stirring, for a period of 20 minutes.

At this point the autoclave pressure was adjusted to 2100 psig, a flow of hydrogen was started through the autoclave to maintain an outlet gas rate of 0.36 liter/min. (as measured at room temperature and atmospheric pressure after caustic scrubbing) and temperature was increased to the hydroconversion temperature of 830° F.

Upon completion of a 180 minute stirred contact at 830° F. and 2100 psig with 0.361 liter/min. gas flow, the flow of hydrogen was stopped, the autoclave blocked off and cooled quickly to 200° F.

Gaseous products in the autoclave were vented at 200° F., caustic scrubbed, measured (volume) and collected for analysis by mass spectrometry. Gaseous products that were collected during the run were also collected and analyzed.

Liquid and solid products from the hydroconversion reaction were washed from the autoclave with toluene and the toluene wash was filtered to recover the solids, which solids comprise catalyst residues and toluene insoluble coke. After washing with toluene the solids were dried under vacuum at 100° C. for one hour, weighed and analyzed for carbon content.

Toluene insoluble coke yield was calculated as follows:

$$\text{Toluene Insol. Coke, wt. \% on 975+}^\circ \text{ F. Feed} = \frac{\left(\dfrac{\text{g. dry solids} \times \text{weight fraction carbon}}{0.85^*}\right)}{\text{g. 974+}^\circ \text{ F. in Feed to Autoclave}} \times 100$$

*Empirical factor for converting g. carbon to g. coke

Unconverted 975+° F. feed was recovered from the combined toluene filtrate and wash by distillation and the 975+° F. product analyzed to determine residual Conradson carbon content.

The yield of toluene insoluble coke obtained with this presulfided-preformed catalyst was 1.8 wt. % and conversion of 975+° F. feed to products boiling below 975° F. was 97.3%.

EXAMPLE 12

Comparative Test of Catalyst Preparation of Example 6 Under Hydroconversion Conditions The hydroconversion test described in Example 11 was repeated except that the source of molybdenum was the catalyst preparation (R-2082-cp) of Example 6, which preparation omitted Step D ($H_2S$ removal) of this invention.

The autoclave charge consisted of 109.50 g of 975+° F. Cold Lake feed, 6.42 g of Cold Lake crude and 4.08 g of catalyst preparation R-2082-cp of Example 6. This amount of catalyst furnished 200 wppm Mo on the total reactor charge.

The yield of toluene insoluble coke that was obtained with this catalyst preparation was 2.70 wt. % and conversion of 975+° F. feed to products boiling below 975° F. was 85.3%.

EXAMPLE 13

Comparative Test of Prior Art Catalyst Described in U.S. Pat. No. 4,244,839 Under Hydroconversion Conditions The hydroconversion test described in Example 11 was repeated except that the source of molybdenum was the catalyst product of Example 7 (R-2088-cp), which is a catalyst prepared according to disclosures in U.S. Pat. No. 4,244,839. The autoclave charge consisted of 109.50 g of 975+° F. Cold Lake crude, 3.12 g of Cold Lake crude and 7.38 g of the catalyst concentrate. This amount of catalyst concentrate provided a Mo concentration of 200 wppm on the autoclave charge, i.e., combined weight of 975+° F. Cold Lake, Cold Lake crude and catalyst concentrate.

There was no evidence of catalyst activity after 15 minutes at hydroconversion conditions, i.e., the amount of gas measured at the outlet matched or exceeded the amount of hydrogen being fed, and the run was subsequently terminated after completion of 30 minutes of the planned 180 minute hydroconversion test. The yield of toluene insoluble coke on 975+° F. feed was 17.4 wt. %.

As can be seen from the summary of results given in Table IV, the presulfided preformed catalyst preparation of this invention (Example 4) provides much better control over coke forming reactions than the comparative catalyst preparations of Example 6 ($H_2S$ present during catalyst preforming step) and Example 7 (prior art catalyst described in U.S. Pat. No. 4,244,839.

TABLE IV

| | Summary of Hydroconversion Test Results | | |
|---|---|---|---|
| Example No. | 11 | 12 | 13 |
| Catalyst Concentrate of Example No. | 4 (Catalyst of this invention) | 6 (Catalyst preformed in presence of $H_2S$) | 7 (Catalyst of prior art) |
| Toluene Insoluble Coke Yield, Wt. % | 1.8 | 2.7 | 17.4 |

What is claimed is:

1. A process for converting a carbonaceous chargestock comprising a hydrocarbon to produce lower boiling products which process comprises reacting said carbonaceous chargestock with hydrogen at a hydrogen partial pressure from about 50 to about 5000 psig at a temperature from about 800° to about 900° F. in the presence of a catalyst concentrate having been prepared by the steps which comprise:
   (a) forming a mixture of hydrocarbonaceous oil comprising constituents boiling above about 1050° F. and said aqueous solution of phosphomolybdic acid in an amount to provide from about 0.2 to 2 weight percent molybdenum, calculated as elemental molybdenum, based on said hydrocarbonaceous oil to produce a water-containing catalyst precursor concentrate;
   (b) drying said water-containing catalyst precursor concentrate to remove said water and produce a substantially water-free catalyst precursor concentrate;
   (c) contacting said water-free catalyst precursor concentrate with added hydrogen sulfide at a temperature from about 50° to about 600° F. and a hyrogen sulfide partial pressure ranging from about 14.7 psia to about 100 psia to produce a sulfided catalyst precursor concentrate;
   (d) separating the unreacted hydrogen sulfide from the sulfided catalyst precursor concentrate;
   (e) heating said sulfided catalyst precursor concentrate, in the absence of hydrogen sulfide and in the absence of hydrogen, at a temperature of at least about 650° F. and a total pressure ranging from about 0 to about 100 psig, for a time sufficient to convert said sulfided catalyst precursor to a solid molybdenum-containing catalyst and, thereby, produce a catalyst concentrate.

2. The process of claim 1 wherein said carbonaceous chargestock comprises coal in a hydrocarbon diluent.

3. The process of claim 1 wherein said heating of step (e) is conducted at a temperature ranging from about 650° to about 800° F. and a total pressure ranging from 0 to about 50 psig.

4. The process of claim 1 wherein said carbonaceous chargestock comprises a hydrocarbonaceous oil and wherein said hydrocarbonaceous oil of step (a) has the same boiling poit range as said hydrocarbonaceous oil of said chargestock.

5. The process of claim 1 wherein said hydrocarbonaceous oil of said step (a) and said hydrocarbon of said chargestock have different boiling point ranges.

6. The process of claim 1 wherein in step (a), said molybdenum is present in said mixture in an amount ranging from about 0.2 to 1 weight percent.

7. The method of claim 1 wherein said hydrocarbonaceous oil of step (a) is an atmospheric residuum.

* * * * *